INVENTORS.
PETER V. ZAGONE
JACK E. HESSE JR.
RICHARD P. JONES
BY

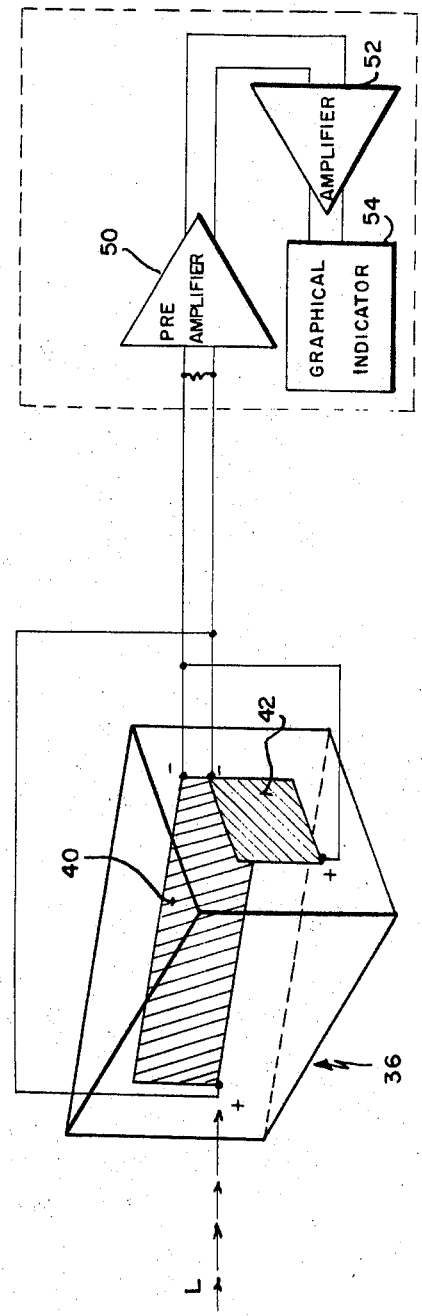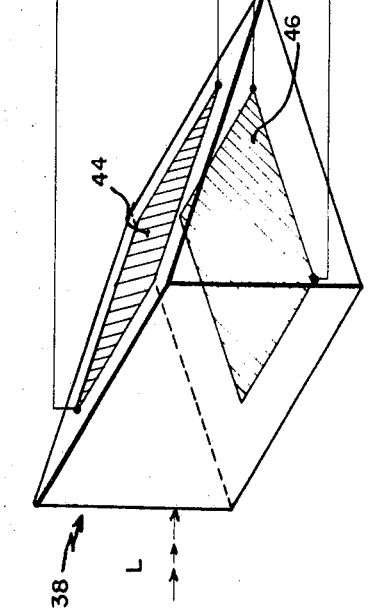
FIG.2
FIG.3
INVENTORS.
PETER V. ZAGONE
JACK E. HESSE JR.
RICHARD P. JONES
BY
ATTORNEYS United States Patent Office 3,439,170
Patented Apr. 15, 1969

3,439,170
INERTIAL PLATFORM STABILIZATION
EMPLOYING A LASER BEAM
Peter V. Zagone, Alamogordo, N. Mex., Jack E. Hesse, Jr., East Hartford, Conn., and Richard P. Jones, Alamogordo, N. Mex., assignors to the United States of America as represented by the Secretary of the Air Force
Filed Mar. 17, 1967, Ser. No. 624,678
Int. Cl. G01j 1/20
U.S. Cl. 250—203                                        3 Claims

ABSTRACT OF THE DISCLOSURE

Four light sensors comprising wedge shaped transparent prisms each having a silicon voltaic cell attached, are mounted on an inertial platform capable of rotation in roll, pitch and yaw. Their interception of a laser beam from a single stationary collimated plane polarized light source is used as a reference for measuring attitude.

---

The invention described herein may be manufactured and used by or for the United States Government for governmental purposes without payment to us of any royalty thereon.

The present invention relates to a three axis attitude monitoring and alignment system operated by a single laser light source and, more particularly, to a monitoring system comprising a single laser light source and four light sensors mounted on an inertial platform capable of rotation about three axes for monitoring roll, pitch and yaw.

The object of the invention is the provision of a device for precisely determining the attitude of an object with reference to any or all of three orthogonal planes such as a vehicle or gyro stabilized inertial platform and making these determinations from a single instrument station. That is to say, angular measurements of the attitude of the object are made with respect to three axes of any arbitrarily selected set of orthogonal vectors.

A further object of the invention is the provision of a device as noted above wherein the reference vectors are selected and their directions are determined with respect to a single, collimated plane polarized laser light source, and wherein the laser light source is then used as a reference for measuring the attitude of the object. The use of a single light source simplifies the mechanization of a monitoring and/or alignment control system. Because only one instrument station is required, computer facilities and interconnection data transmission are minimized. Further, the use of a laser for this purpose provides a plane polarized light without the use of additional optics. The laser provides, with minimal additional optics, a highly collimated light source that can be used over greater distances than is possible with any ordinary light source.

One of the chief advantages of this invention is the simplicity and economy with which it can be applied to attitude monitoring and control.

A further object, therefore, is the accomplishment of the above stated objects using a single source or reference instrument.

Specifically, an object of the invention is the provision of a device for continuous monitoring of the attitude of a sledborne inertial platform during high speed sled tests. Its application may also be extended to prelaunch erection and alignment of inertial platforms used variously in missile and space vehicle programs.

These and other advantages, features and objects of the invention will become more apparent from the following description taken in connection with the illustrative embodiments in the accompanying drawings, wherein:

FIGURES 2 and 3 are schematic representations of the yaw and pitch sensors and their connection in diagram to recording devices including preamplifiers, amplifiers and graphic indicators.

Figure 1:
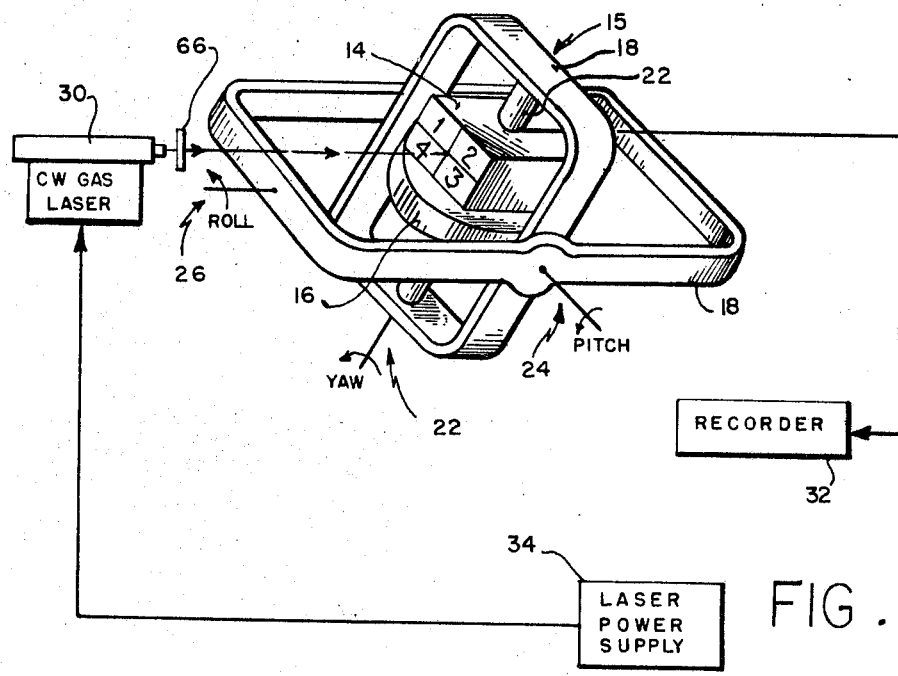
FIGURE 1 is a perspective view of the device with a diagrammatic showing of the recorder and the laser power supply.

Referring more particularly to the drawing, a continuous-wave laser is indicated at 10 and its power supply at 12. This may be, for example, a commercially available gas, continuous-wave laser with output wavelength of 6328 A.

Four light sensors, numbered 1, 2, 3 and 4 (see FIGURE 1) are mounted in a mounting block 14. The block 14 is fixed to an inertial platform indicated generally by the numeral 15. The inertial platform may be a gyro stabilized platform such as that used in the Thor guidance system and is capable of rotation about three orthogonally arranged axes. As shown in FIGURE 1, the light sensors are mounted in the three gimbal elements 16, 18 and 20 for rotation about the three axes, respectively, the yaw axis 22, the pitch axis 24 and the roll axis 26. Light from the laser 30 is intercepted by the light sensor units 1, 2, 3 and 4 wherein signals are generated, amplified and recorded. The laser may be, for example, a CN gas laser, operated from a laser power supply indicated schematically at 34.

The yaw and pitch sensor units 1 and 2 are comprised of wedge shaped transparent prisms 36 and 38, respectively, each prism having right edges perpendicular. Attached to the prisms 36 and 38 are silicon photovoltaic cells 40 and 42 on the yaw unit and 44 and 46 on the pitch unit.

Referring specifically to sensor unit 1, the quantity of light from the beam L entering the prism 36 and reaching each of the cells 40 and 42, is proportional to the angle of incidence of the light with respect to the geometry of the prism 36; that is, the angle of incidence of the beam L and the amount of its refraction within the prism before it strikes the cells 40 and 42. This is determined by a geometric analysis of light refraction. The cells 40 and 42 connect, respectively, to recording units indicated schematically at 48 and 48'. These are recording units for both sensor units 1 and 2 and comprise preamplifiers 50 and 50', amplifiers 52 and 52' and some sort of recording instrumentation 54 and 54', which may be a graphic pen recording.

Referring again individually to sensor 1, since the voltage developed across each photovoltaic cell 40 and 42 is proportional to the quantity of light incident upon each cell, the voltage output of the two cells 40 and 42 of sensor 1 is proportional to the angle of incidence of the incident light with respect to sensor 1. This will be a measure of the yaw attitude.

The same conditions hold true for sensor unit 2, which measures pitch attitude.

The output voltages of each sensor unit may be subtracted, for example, across one megohm resistor in the recorder input stages. The difference voltage is then amplified (see 52 and 52') and recorded by and desired means.

The method of combining and recording the sensor outputs is not critical to the invention. The invention is not limited to these specifically described means and may be achieved by any expedient. For example, the outputs can be read directly on voltmeters or ammeters, or indirectly through radio or wire links to any number of difference recorders. The quantity and quality of sensor output amplification will determine the accuracy of angular measurement possible.

Figure 4:
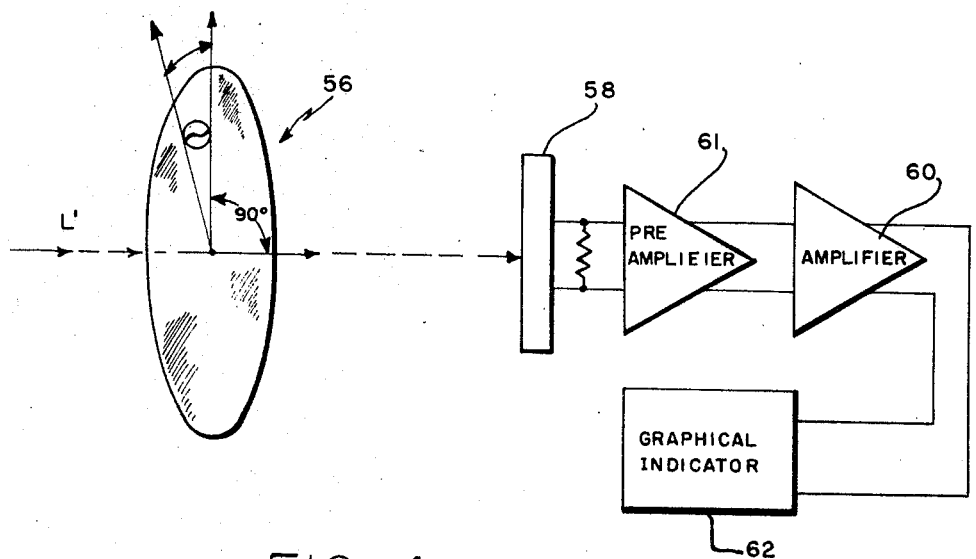
FIGURE 4 is a schematic showing of the roll sensor and showing also in diagram the connection of the amplifiers and graphic indicators.

Sensor unit 3 and its operation is shown schematically in FIGURE 4. Roll of the inertial platform is determined and measured by this unit. It consists of a polarizing filter shown schematically at 56 and a silicon photovoltaic cell 58, both standard elements and commercially available. Because of inherent characteristics of the laser light source, the incident light beam L' is plane polarized.

The transverse wave theory of polarized light requires that the intensity of light passed through the filter be proportional to the square of the sine of the angle, $\theta$, which is the angle between the plane of polarization of the incident light L' and the plane perpendicular to the polarization plane of the filter 58. Therefore, the voltage developed across the silicon cell 58 of sensor unit 3 is also proportional to the square of the sine $\theta$. If this voltage is suitably amplified and displayed (see amplifier 60, preamplifier 61 and graphic indicator 62), the angle $\theta$ can be mathematically determined. For small values of $\theta$, usually less than 5 degrees, the output voltage is for most practical purposes directly proportional to $\theta$. Now by examining FIGURE 1, it can be seen that $\theta$ is the roll of the inertial platform.

A fourth light sensor, sensor 4, is indicated on FIGURE 1, and forms part of the concept of the invention. Sensor 4 consists of a silicon photovoltaic cell, which is mounted with its sensitive face nominally perpendicular to the direction of incident light L. The output voltage of the sensor will be proportional to the intensity of incident light only. This output voltage can be used as a mathematical reference for correcting the voltage outputs of sensors 1, 2 and 3 for variations in the light intensity. These variations will occur in the case of an inertial platform moving with respect to the light source because of the variations in distance and atmospheric attenuation.

Another element which forms part of the inventive concept is the placement of commercially available light filters (see FIGURE 1, numeral 66) between the light source and sensors. These filters will selectively pass only that light which is approximately the wave length of the laser source and will attenuate light of all other wave lengths. The purpose of these filters is to attenuate ambient light, which does not contain information, thereby increasing signal-to-noise ratio of the system.

The voltage signals from the sensors described herein, can be used in a feedback system to control the attitude of the inertial platform. The invention uses, for its reference directions, an optional signal which can be aligned and fixed to a set of known reference directions, for instance, the directions determined by a set of terrestrial bench marks. This system of reference directions is not subject to the drift uncertainties present in gyroscopic de-devices or similar inertial references.

Although the invention has been described with reference to a particular embodiment, it will be understood to those skilled in the art that the invention is capable of a variety of alternative embodiments within the spirit and scope of the appended claims.

We claim:
1. A device for determining the attitude of an object in three planes and from a single instrument station, said device comprising: an inertial platform capable of rotation about three orthogonally arranged axes, a laser source located at said instrument station, a block of sensor units fixed to said inertial platform and movable therewith; first, second, third and fourth sensor units located in said block to receive beams from said laser, the first and second of said sensor units comprising pitch and yaw monitoring means, each of said first and second units comprising a transparent wedge shaped prism having a light receiving surface disposed perpendicularly to the base of said block, a pair of faces on each prism, said faces forming a wedge opposite to said receiving surface, the intersecting planes of said prism faces forming lines respectively parallel and perpendicular to the base of said block, a photovoltaic cell on each of said faces, thereby forming pitch and yaw monitoring prisms respectively, the amount of light reaching each of said light sensitive cells being proportional to the angle of incidence of the laser beam upon the light receiving surfaces and the refraction of the beam within the prism as it is governed by said angle.

2. A device as claimed in claim 1 wherein said third sensor unit for monitoring roll of said inertial platform comprises a polarizing filter to receive said laser beam and a photovoltaic cell for receiving the beam from said polarizing filter, and wherein the voltage developed in said photovoltaic cell will be proportional to the angle between the plane of polarization of the incident light and the plane perpendicular to the polarization of the filter.

3. A device as claimed in claim 2 wherein said fourth sensor unit comprises a control reference for correcting the output voltages of said first, second and third sensor units for detection of variations in light intensity caused by variations in distance and atmospheric attenuation.

References Cited

UNITED STATES PATENTS

| | | | |
|---|---|---|---|
| 2,856,778 | 10/1958 | Kibert | 74—5.6 |
| 2,952,779 | 9/1960 | Talley | 88—14 X |
| 3,137,794 | 6/1964 | Seward | 250—203 X |
| 3,190,131 | 6/1965 | Daubert | 250—203 X |
| 3,254,537 | 6/1966 | Elwell et al. | 74—5.6 |
| 3,277,304 | 10/1966 | Vyce | 74—5.6 |
| 3,316,799 | 5/1967 | Daley et al. | 250—225 X |
| 3,328,595 | 6/1967 | Todd | 74—5.6 X |
| 3,336,832 | 8/1967 | Snavley | 250—225 X |

OTHER REFERENCES

King et al., Sensitive Method for the Measurement of Small Rotations, In Journal of Scientific Instruments. December 1959, pp. 507–509 relied on.

JAMES W. LAWRENCE, *Primary Examiner.*

C. R. CAMPBELL, *Assistant Examiner.*

U.S. Cl. X.R.

250—208, 212, 210, 225; 88—14; 74—5.6; 244—3.20